(12) United States Patent
Wrappe

(10) Patent No.: US 9,137,771 B2
(45) Date of Patent: Sep. 15, 2015

(54) METHODS AND APPARATUSES FOR BEACON ASSISTED POSITION DETERMINATION SYSTEMS

(75) Inventor: Thomas Keith Wrappe, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1167 days.

(21) Appl. No.: 11/547,290

(22) PCT Filed: Apr. 2, 2004

(86) PCT No.: PCT/US2004/010307
§ 371 (c)(1),
(2), (4) Date: Apr. 16, 2008

(87) PCT Pub. No.: WO2005/106523
PCT Pub. Date: Nov. 10, 2005

(65) Prior Publication Data
US 2008/0280624 A1    Nov. 13, 2008

(51) Int. Cl.
*H04W 24/00* (2009.01)
*H04W 64/00* (2009.01)
(Continued)

(52) U.S. Cl.
CPC ............... *H04W 64/00* (2013.01); *G01S 1/68* (2013.01); *G01S 5/0036* (2013.01); *G01S 19/11* (2013.01);
(Continued)

(58) Field of Classification Search
CPC ....... H04W 4/02; H04W 64/00; H04W 4/025; H04W 4/023; H04W 64/003; H04W 4/008; H04M 2242/30; G01C 21/206; G01C 21/165; G01S 19/48; G01S 3/02; G01S 5/0257; G01S 19/46
USPC ............. 455/456.1–457, 404.2, 552.1, 550.1, 455/562.1, 440–444, 456.1–456.6; 370/331–333; 342/357.03, 357.06, 342/357.2, 357.25, 357.28, 357.29, 357.3, 342/357.31, 357.39
See application file for complete search history.

(56) References Cited

U.S. PATENT DOCUMENTS

| 4,112,421 A | 9/1978 | Freeny, Jr. |
| 4,567,483 A | 1/1986 | Bateman et al. |

(Continued)

FOREIGN PATENT DOCUMENTS

| CN | 1263679 A | 8/2000 |
| CN | 101218810 A | 7/2008 |

(Continued)

OTHER PUBLICATIONS

International Search Report—PCT/US04/010307, International Search Authority—United States—Aug. 31, 2004.
(Continued)

*Primary Examiner* — Olumide T Ajibade Akonai

(57) ABSTRACT

Methods and apparatuses for microcell beacon assisted position determination. In one embodiment, microcell beacons that are based on low cost, mass market electronics for wireless local area data communication (e.g., Bluetooth or WiFi) are used to broadcast to mobile stations location information and/or identification information, which can be used to look up for the location information, to improve the precision of position solutions in a wide area position determination system (e.g., a GPS system, an AFLT system, or a hybrid system). In one embodiment, the location information and/or the identification information are site specific; and, the distribution and the transmission strength of the microcell beacons are adjusted to prevent misidentification. In one embodiment, the microcell beacons have the transmission capability but not the receiving capability for wireless local area data communication; and, the mobile station has the receiving capability but not the transmission capability for wireless local area data communication.

20 Claims, 8 Drawing Sheets

(51) Int. Cl.
  *G01S 1/68*    (2006.01)
  *G01S 5/00*    (2006.01)
  *G01S 19/11*   (2010.01)
  *G01S 19/46*   (2010.01)
  *H04W 4/02*    (2009.01)
  *G01S 5/02*    (2010.01)
  *G01S 19/17*   (2010.01)

(52) U.S. Cl.
  CPC .............. *G01S 19/46* (2013.01); *G01S 5/0236* (2013.01); *G01S 19/17* (2013.01); *H04W 4/02* (2013.01); *H04W 64/003* (2013.01)

(56) References Cited

U.S. PATENT DOCUMENTS

| | | |
|---|---|---|
| 5,075,693 A | 12/1991 | McMillan et al. |
| 5,422,813 A * | 6/1995 | Schuchman et al. ........... 455/440 |
| 5,515,419 A | 5/1996 | Sheffer |
| 5,537,460 A | 7/1996 | Holliday, Jr. et al. |
| 5,570,412 A | 10/1996 | LeBlanc |
| 5,588,848 A | 12/1996 | Law et al. |
| 5,608,410 A | 3/1997 | Stilp et al. |
| 5,613,205 A | 3/1997 | Dufour |
| 5,657,487 A | 8/1997 | Doner |
| 5,706,333 A | 1/1998 | Grenning et al. |
| 5,717,406 A | 2/1998 | Sanderford et al. |
| 5,731,786 A | 3/1998 | Abraham et al. |
| 5,736,957 A | 4/1998 | Raney |
| 5,812,087 A | 9/1998 | Krasner |
| 5,841,396 A | 11/1998 | Krasner |
| 5,873,040 A | 2/1999 | Dunn et al. |
| 5,874,914 A | 2/1999 | Krasner |
| 5,883,598 A | 3/1999 | Parl et al. |
| 5,936,572 A * | 8/1999 | Loomis et al. ........... 342/357.29 |
| 5,945,944 A | 8/1999 | Krasner |
| 5,960,341 A | 9/1999 | LeBlanc et al. |
| 5,969,669 A | 10/1999 | Ishikawa et al. |
| 5,982,324 A * | 11/1999 | Watters et al. ........... 342/357.29 |
| 5,987,306 A | 11/1999 | Nilsen et al. |
| 5,999,124 A * | 12/1999 | Sheynblat ................ 342/357.29 |
| 6,014,102 A | 1/2000 | Mitzlaff et al. |
| 6,061,018 A | 5/2000 | Sheynblat |
| 6,122,266 A | 9/2000 | Lynch |
| 6,128,501 A | 10/2000 | Ffoulkes-Jones |
| 6,161,018 A | 12/2000 | Reed et al. |
| 6,166,685 A | 12/2000 | Soliman |
| 6,167,275 A | 12/2000 | Oros et al. |
| 6,175,500 B1 | 1/2001 | Roy |
| 6,188,354 B1 | 2/2001 | Soliman et al. |
| 6,208,290 B1 * | 3/2001 | Krasner ................... 342/357.43 |
| 6,215,441 B1 | 4/2001 | Moeglein et al. |
| 6,215,442 B1 | 4/2001 | Sheynblat et al. |
| 6,216,064 B1 | 4/2001 | Johnson et al. |
| 6,222,483 B1 | 4/2001 | Twitchell et al. |
| 6,230,018 B1 | 5/2001 | Watters et al. |
| 6,236,365 B1 | 5/2001 | LeBlanc et al. |
| 6,243,587 B1 | 6/2001 | Dent et al. |
| 6,243,591 B1 * | 6/2001 | Takemura ..................... 455/522 |
| 6,246,861 B1 | 6/2001 | Messier et al. |
| 6,249,252 B1 | 6/2001 | Dupray |
| 6,252,543 B1 * | 6/2001 | Camp ..................... 342/357.29 |
| 6,263,208 B1 | 7/2001 | Chang et al. |
| 6,275,702 B1 | 8/2001 | Peltonen |
| 6,275,707 B1 | 8/2001 | Reed et al. |
| 6,289,280 B1 * | 9/2001 | Fernandez-Corbaton et al. ............ 701/469 |
| 6,313,786 B1 | 11/2001 | Sheynblat et al. |
| 6,313,787 B1 | 11/2001 | King et al. |
| 6,314,294 B1 | 11/2001 | Benveniste |
| 6,330,628 B1 | 12/2001 | Motoyama |
| 6,353,412 B1 | 3/2002 | Soliman |
| 6,362,778 B2 | 3/2002 | Neher |
| 6,393,294 B1 | 5/2002 | Perez-Breva et al. |
| 6,433,735 B1 | 8/2002 | Bloebaum et al. |
| 6,438,382 B1 | 8/2002 | Boesch et al. |
| 6,445,927 B1 | 9/2002 | King et al. |
| 6,466,797 B1 | 10/2002 | Frodigh et al. |
| 6,466,938 B1 | 10/2002 | Goldberg |
| 6,490,313 B1 | 12/2002 | Ganesh et al. |
| 6,501,955 B1 | 12/2002 | Durrant et al. |
| 6,507,741 B1 | 1/2003 | Bassirat |
| 6,526,039 B1 | 2/2003 | Dahlman et al. |
| 6,529,164 B1 * | 3/2003 | Carter ........................... 342/463 |
| 6,538,601 B2 | 3/2003 | Bruno et al. |
| 6,556,829 B1 | 4/2003 | Persson |
| 6,590,530 B2 | 7/2003 | Van Diggelen et al. |
| 6,603,966 B1 | 8/2003 | Sheffield |
| 6,628,944 B1 | 9/2003 | Jeong et al. |
| 6,636,740 B1 | 10/2003 | Ramesh |
| 6,636,744 B1 | 10/2003 | Da |
| 6,684,158 B1 | 1/2004 | Garin et al. |
| 6,707,422 B2 | 3/2004 | Sheynblat et al. |
| 6,731,672 B1 * | 5/2004 | Eschenbach .................. 375/140 |
| 6,754,470 B2 | 6/2004 | Hendrickson et al. |
| 6,757,544 B2 | 6/2004 | Rangarajan et al. |
| 6,799,050 B1 | 9/2004 | Krasner |
| 6,799,054 B2 | 9/2004 | Shpak |
| 6,806,830 B2 | 10/2004 | Panasik et al. |
| 6,813,561 B2 * | 11/2004 | MacNeille et al. ........... 701/470 |
| 6,865,395 B2 | 3/2005 | Riley |
| 6,895,249 B2 | 5/2005 | Gaal |
| 6,898,197 B1 | 5/2005 | Lavean |
| 6,928,292 B2 * | 8/2005 | Tsunehara et al. ......... 455/456.1 |
| 6,941,145 B2 | 9/2005 | Ogino et al. |
| 6,957,072 B2 | 10/2005 | Kangras et al. |
| 6,970,795 B1 | 11/2005 | Burgett et al. |
| 7,065,351 B2 | 6/2006 | Carter et al. |
| 7,072,316 B2 | 7/2006 | Proctor, Jr. et al. |
| 7,084,809 B2 | 8/2006 | Hockley, Jr. et al. |
| 7,123,928 B2 | 10/2006 | Moeglein et al. |
| 7,127,257 B2 | 10/2006 | Riley et al. |
| 7,139,580 B2 | 11/2006 | Stein et al. |
| 7,203,497 B2 | 4/2007 | Belcea |
| 7,209,758 B1 | 4/2007 | Moll et al. |
| 7,239,272 B2 | 7/2007 | Vyas et al. |
| 7,257,411 B2 * | 8/2007 | Gwon et al. ............... 455/456.1 |
| 7,286,515 B2 | 10/2007 | Olson et al. |
| 7,359,706 B2 | 4/2008 | Zhao |
| 7,363,028 B2 | 4/2008 | De Clerq et al. |
| 7,383,049 B2 | 6/2008 | Deloach, Jr. et al. |
| 7,525,484 B2 * | 4/2009 | Dupray et al. ................ 342/450 |
| 7,558,852 B2 | 7/2009 | Douglas et al. |
| 7,684,473 B2 | 3/2010 | Walton et al. |
| 7,751,829 B2 * | 7/2010 | Masuoka et al. ........... 455/456.1 |
| 7,821,986 B2 | 10/2010 | Thomson et al. |
| 7,860,527 B2 | 12/2010 | Ngai et al. |
| 7,936,736 B2 | 5/2011 | Proctor, Jr. et al. |
| 8,144,673 B2 | 3/2012 | Alizadeh-Shabdiz |
| 8,150,421 B2 | 4/2012 | Ward et al. |
| 8,204,512 B2 | 6/2012 | Dietrich et al. |
| 8,244,274 B2 | 8/2012 | Grigsby et al. |
| 2001/0022558 A1 | 9/2001 | Karr, Jr. et al. |
| 2001/0034223 A1 | 10/2001 | Rieser et al. |
| 2001/0041566 A1 | 11/2001 | Xanthos et al. |
| 2002/0008662 A1 * | 1/2002 | Dooley et al. ................. 342/458 |
| 2002/0022482 A1 | 2/2002 | Ishikawa |
| 2002/0025822 A1 | 2/2002 | Hunzinger |
| 2002/0065107 A1 | 5/2002 | Harel et al. |
| 2002/0076951 A1 | 6/2002 | Roy |
| 2002/0076952 A1 | 6/2002 | Roy |
| 2002/0076958 A1 | 6/2002 | Roy et al. |
| 2002/0095486 A1 | 7/2002 | Bahl |
| 2002/0131255 A1 | 9/2002 | Roy |
| 2002/0137404 A1 | 9/2002 | Roy |
| 2002/0175855 A1 | 11/2002 | Richton et al. |
| 2002/0193946 A1 | 12/2002 | Turnbull |
| 2003/0007468 A1 | 1/2003 | Joshi et al. |
| 2003/0048758 A1 | 3/2003 | Jones et al. |
| 2003/0068977 A1 | 4/2003 | King |
| 2003/0083064 A1 | 5/2003 | Cooper |
| 2003/0095527 A1 | 5/2003 | Shanbhag |
| 2003/0125045 A1 | 7/2003 | Riley et al. |
| 2003/0129987 A1 | 7/2003 | Tanay et al. |

(56) References Cited

U.S. PATENT DOCUMENTS

| | | | |
|---|---|---|---|
| 2003/0134648 A1 | 7/2003 | Reed et al. | |
| 2003/0190919 A1 | 10/2003 | Niemenmaa | |
| 2003/0195008 A1 | 10/2003 | Mohi et al. | |
| 2003/0206579 A1 | 11/2003 | Bryant | |
| 2004/0034471 A1 | 2/2004 | Rorabaugh | |
| 2004/0110518 A1 | 6/2004 | Swift et al. | |
| 2004/0180670 A1 | 9/2004 | Pande et al. | |
| 2004/0203727 A1 | 10/2004 | Abiri et al. | |
| 2004/0203853 A1* | 10/2004 | Sheynblat | 455/456.1 |
| 2004/0263386 A1 | 12/2004 | King et al. | |
| 2005/0070304 A1* | 3/2005 | Farchmin et al. | 455/456.1 |
| 2005/0090266 A1 | 4/2005 | Sheynblat | |
| 2005/0113107 A1 | 5/2005 | Meunier | |
| 2005/0136845 A1* | 6/2005 | Masuoka et al. | 455/456.6 |
| 2005/0192024 A1* | 9/2005 | Sheynblat | 455/456.1 |
| 2006/0030290 A1 | 2/2006 | Rudolf et al. | |
| 2006/0211431 A1 | 9/2006 | Mansour et al. | |
| 2006/0232466 A1 | 10/2006 | Park et al. | |
| 2006/0276202 A1 | 12/2006 | Moeglein et al. | |
| 2007/0042790 A1 | 2/2007 | Mohi et al. | |
| 2007/0053474 A1 | 3/2007 | Kim | |
| 2007/0139267 A1 | 6/2007 | Black et al. | |
| 2007/0258421 A1 | 11/2007 | Alizadeh-Shabdiz et al. | |
| 2008/0008118 A1 | 1/2008 | Alizadeh-Shabdiz | |
| 2008/0032706 A1 | 2/2008 | Sheynblat et al. | |
| 2008/0096579 A1* | 4/2008 | Gill | 455/456.1 |
| 2008/0242312 A1 | 10/2008 | Paulson et al. | |
| 2008/0294334 A1 | 11/2008 | Jo et al. | |
| 2009/0017877 A1 | 1/2009 | Lin | |
| 2009/0146870 A1 | 6/2009 | Thome et al. | |
| 2009/0225743 A1 | 9/2009 | Nicholls et al. | |
| 2010/0073229 A1 | 3/2010 | Pattabiraman et al. | |
| 2010/0093377 A1 | 4/2010 | Riley et al. | |
| 2010/0099375 A1 | 4/2010 | Rowitch | |
| 2011/0028166 A1 | 2/2011 | Ketchum et al. | |
| 2011/0263219 A1 | 10/2011 | Hasenfang et al. | |

FOREIGN PATENT DOCUMENTS

| | | | |
|---|---|---|---|
| CN | 101238642 A | 8/2008 | |
| EP | 0930514 A2 | 7/1999 | |
| EP | 1008862 A1 | 6/2000 | |
| EP | 1122554 A1 | 8/2001 | |
| EP | 2015535 A1 | 1/2009 | |
| GB | 2364617 | 1/2002 | |
| JP | 5336564 A | 12/1993 | |
| JP | 8237729 A | 9/1996 | |
| JP | 9261159 A | 10/1997 | |
| JP | 1070752 | 3/1998 | |
| JP | 2001112050 A | 4/2001 | |
| JP | 2002152104 | 5/2002 | |
| JP | 2002518684 A | 6/2002 | |
| JP | 2002300100 A | 10/2002 | |
| JP | 2003296152 A | 10/2003 | |
| JP | 2004166056 A | 6/2004 | |
| JP | 2005020053 A | 1/2005 | |
| JP | 2005535901 T | 11/2005 | |
| JP | 2007506099 A | 3/2007 | |
| JP | 2008501260 A | 1/2008 | |
| KR | 20010052859 A | 6/2001 | |
| KR | 1020050050641 | 5/2005 | |
| WO | WO9603679 A1 | 2/1996 | |
| WO | WO9631076 | 10/1996 | |
| WO | WO9642179 A1 | 12/1996 | |
| WO | WO9705722 A2 | 2/1997 | |
| WO | WO9944375 A1 | 9/1999 | |
| WO | WO0038460 A1 | 6/2000 | |
| WO | WO-0059257 A1 | 10/2000 | |
| WO | WO0133302 | 5/2001 | |
| WO | WO0150151 A1 * | 7/2001 | G01S 5/14 |
| WO | WO0173466 A1 | 10/2001 | |
| WO | WO0184862 | 11/2001 | |
| WO | WO0199444 A1 | 12/2001 | |
| WO | WO0223215 | 3/2002 | |
| WO | WO0251192 A1 | 6/2002 | |
| WO | WO03010552 A2 | 2/2003 | |
| WO | WO03019835 A1 | 3/2003 | |
| WO | WO03058986 A2 | 7/2003 | |
| WO | WO2004102865 A1 | 11/2004 | |
| WO | WO-2009014281 A1 | 1/2009 | |
| WO | WO2009017877 | 2/2009 | |
| WO | 2009149104 A2 | 12/2009 | |

OTHER PUBLICATIONS

TIA/856-A, "CDMA2000 High Rate Packet Data Air Interface Specification" (Apr. 2004).
TIA/EIA-95-B;Mobile Station-Base Station Compatibility Standard for Wideband Spread Spectrum Cellular Systems (Mar. 1999).
Written Opinion—PCT/US2004/010307—ISA/EPO—Aug. 31, 2004.
3GPP2 C.S0010-C. "Recommended Minimum Performance Standards for cdma2000 Spread Spectrum Base Stations," version 1.0, Release C, Jan. 14, 2005.
3GPP2 C.S0010-C. "Recommended Minimum Performance Standards for cdma2000 Spread Spectrum Base Stations," version 2.0, Release C, Feb. 24, 2006.
3GPP2 C.S0022-0-1, Publication Version, Date: Feb. 16, 2001, 3rd Generation Partnership Project 2 (3GPP2), Position Determination Service Standard for Dual Mode Spread Spectrum Systems, Addendum (TIA/EIA/IS-801-1).
Biacs, et al., "The Qualcomm/Snaptrack Wireless-Assisted GPS Hybrid Positioning System and Reults from Initial Commercial Deployments" Proceedings of the Institute of Navigation, ION GPS 2002, Online, Sep. 24, 2002, pp. 378-384.
GSM 04.31, V8.1.0 (Apr. 2000), Digital Cellular Telecommunications System (Phase 2+); Location Services (LCS); Mobile Station (MS)—Serving Mobile Location Centre (SMLC) Radio Resource LCS Protocol (RRLP) (GSM 04.31 version 8.1.0 Release 1999).
Savarese C et al: "Locationing in distributed ad-hoc wireless sensor networks" 2001 IEEE International Conference on Acoustics, Speech, and Signal Processing. Proceedings. (ICASSP). Salt Lake City, UT, May 7-11, 2001, IEEE International Conference on Acoustics, Speech, and Signal Processing (ICASSP), New York, NY: IEEE, US, vol. 4 of 6, May 7, 2001, pp. 2037-2040, XP002225743 ISBN: 0-7803-7041-4.
Telecommunications Industry Association, Mobile Station-Base Station Compatibility Standard for Dual-Mode Wideband Spread Spectrum Cellular System, TIA/EIA-95, Jul. 1993, 668 pages.
TIA/EIA J-STD-036-A, "Enhanced Wireless 9 1 1, Phase 2", TIA: Published Jun. 2002.
TIA/EIA/IS-2000—Introduction to cdma2000 Standards for Spread Spectrum Systems; Physical Layer Standard for cdma2000 Spread Spectrum Systems; Medium Access Control (MAC) Standard for cdma2000 Spread Spectrum Systems; Signaling Link Access Control (LAC) Standard for cdma2000 Spread Spectrum Systems; Upper Layer (Layer 3) Signaling Standard for cdma2000 Spread Spectrum Systems; Analog Signaling Standard for cdma2000 Spread Spectrum Systems (V.1.0, Release C, May 28, 2002).

* cited by examiner

METHODS AND APPARATUSES FOR BEACON ASSISTED POSITION DETERMINATION SYSTEMS

FIELD OF THE TECHNOLOGY

The invention relates to position determination systems, and more particularly to hybrid positioning using wireless communication signals and Satellite Positioning System (SPS) signals.

BACKGROUND

To perform position location in wireless cellular networks (e.g., a cellular telephone network), several approaches perform trilateration based upon the use of timing information sent between each of several base stations and a mobile device, such as a cellular telephone. One approach, called Advanced Forward Link Trilateration (AFLT) or Enhanced Observed Time Difference (EOTD), measures at the mobile device the times of arrival of signals transmitted from each of several base stations. These times are transmitted to a Position Determination Entity (PDE) (e.g., a location server), which computes the position of the mobile device using these times of reception. The transmit times at these base stations are coordinated such that at a particular instance of time, the times-of-day associated with multiple base stations are within a specified error bound. The accurate positions of the base stations and the times of reception are used to determining the position of the mobile device.

FIG. 1 shows an example of an AFLT system where the times of reception (TR1, TR2, and TR3) of signals from cellular base stations 101, 103, and 105 are measured at the mobile cellular telephone 111. This timing data may then be used to compute the position of the mobile device. Such computation may be done at the mobile device itself, or at a location server if the timing information so obtained by the mobile device is transmitted to the location server via a communication link. Typically, the times of receptions are communicated to a location server 115 through one of the cellular base stations (e.g., base station 101, or 103, or 105). The location server 115 is coupled to receive data from the base stations through wireless network 113 (e.g., a mobile switching center), circuit switched network 117 (e.g., land line Public Switched Telephone Network) and/or packet switched network 119 (e.g., packet data service node). The location server may include a base station almanac (BSA) server, which provides the location of the base stations and/or the coverage area of base stations. Alternatively, the location server and the BSA server may be separate from each other; and, the location server communicates with the base station to obtain the base station almanac for position determination. A mobile switching center may provide signals (e.g., voice communications) to and from a land line Public Switched Telephone Network (PSTN) or a packet data service node so that signals may be conveyed to and from the mobile telephone to other telephones (e.g., land line phones on the PSTS or other mobile telephones). The location server may also monitor emissions from several of the base stations in an effort to determine the relative timing of these emissions.

In another approach, called Time Difference of Arrival (TDOA), the times of reception of a signal from a mobile device is measured at several base stations (e.g., measurements taken at base stations 101, 103 and 105). FIG. 1 applies to this case if the arrows of TR1, TR2, and TR3 are reversed. This timing data may then be communicated to the location server to compute the position of the mobile device.

Yet a third method of doing position location involves the use in the mobile device of a receiver for the United States Global Positioning Satellite (GPS) system or other Satellite Positioning System (SPS), such as the Russian GLONASS system and the proposed European Galileo System, or a combination of satellites and pseudolites. Pseudolites are ground-based transmitters, which broadcast a PN code (similar to a GPS signal) modulated on an L-band carrier signal, generally synchronized with SPS time. Each transmitter may be assigned a unique PN code so as to permit identification by a remote receiver. Pseudolites are useful in situations where SPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites. Such a method using a receiver for SPS signals may be completely autonomous or may utilize the cellular network to provide assistance data or to share in the position calculation. As shorthand, we call these various methods "SPS". Examples of such methods are described in U.S. Pat. Nos. 6,208,290; 5,841,396; 5,874,914; 5,945,944; and 5,812,087. For instance, U.S. Pat. No. 5,945,944 describes a method to obtain from cellular phone transmission signals accurate time information, which is used in combination with SPS signals to determine the position of the receiver; U.S. Pat. No. 5,874,914 describes a method to transmit the Doppler frequency shifts of in view satellites to the receiver through a communication link to determine the position of the receiver, U.S. Pat. No. 5,874,914 describes a method to transmit satellite almanac data (or ephemeris data) to a receiver through a communication link to help the receiver to determine its position; U.S. Pat. No. 5,874,914 also describes a method to lock to a precision carrier frequency signal of a cellular telephone system to provide a reference signal at the receiver for SPS signal acquisition; U.S. Pat. No. 6,208,290 describes a method to use an approximate location of a receiver to determine an approximate Doppler for reducing SPS signal processing time; and, U.S. Pat. No. 5,812,087 describes a method to compare different records of a satellite data message received at different entities to determine a time at which one of the records is received at a receiver in order to determine the position of the receiver. In practical low-cost implementations, both the mobile cellular communications receiver and the SPS receiver are integrated into the same enclosure and, may in fact share common electronic circuitry.

In yet another variation of the above methods, the round trip delay (RTD) is found for signals that are sent from the base station to the mobile device and then are returned. In a similar, but alternative, method the round trip delay is found for signals that are sent from the mobile device to the base station and then returned. Each of these round-trip delays is divided by two to determine an estimate of the one-way time delay. Knowledge of the location of the base station, plus a one-way delay constrains the location of the mobile device to a circle on the earth. Two such measurements from distinct base stations then result in the intersection of two circles, which in turn constrains the location to two points on the earth. A third measurement (even an angle of arrival or cell sector) resolves the ambiguity.

A combination of either the AFLT or TDOA with an SPS system is called a "hybrid" system. For example, U.S. Pat. No. 5,999,124 describes a hybrid system, in which the position of a cell based transceiver is determined from a combination of at least: i) a time measurement that represents a time of travel of a message in the cell based communication signals between the cell based transceiver and a communication system; and, ii) a time measurement that represents a time of travel of an SPS signal.

Altitude aiding has been used in various methods for determining the position of a mobile device. Altitude aiding is typically based on a pseudo-measurement of the altitude. The knowledge of the altitude of a location of a mobile device constrains the possible positions of the mobile device to a surface of a sphere (or an ellipsoid) with its center located at the center of the earth. This knowledge may be used to reduce the number of independent measurements required to determine the position of the mobile device. For example, U.S. Pat. No. 6,061,018 describes a method where an estimated altitude is determined from the information of a cell object, which may be a cell site that has a cell site transmitter in communication with the mobile device.

SUMMARY OF THE DESCRIPTION

Methods and apparatuses for microcell beacon assisted position determination are described here. Some of the embodiments of the present invention are summarized in this section.

In one embodiment of the present invention, microcell beacons that are based on low cost, mass market electronics for wireless local area data communication (e.g., Bluetooth or WiFi) are used to broadcast to mobile stations location information and/or identification information, which can be used to look up for the location information, to improve the precision of position solutions in a wide area position determination system (e.g., a GPS system, an AFLT system, or a hybrid system). In one embodiment, the location information and/or the identification information are site specific; and, the distribution and the transmission strength of the microcell beacons are adjusted to prevent misidentification. In one embodiment, the microcell beacons have the transmission capability but not the receiving capability for wireless local area data communication; and, the mobile station has the receiving capability but not the transmission capability for wireless local area data communication. The location information may be the coordinates (e.g., longitude, latitude and altitude), the physical addresses (e.g., street address), or other location specific information (e.g., an identification number of an area).

In one aspect of the present invention, a mobile station in a position determination system, includes: a control circuit; an SPS (Satellite Positioning System) signal receiver coupled to the control circuit to generate SPS positioning information from SPS signals received at the mobile station; a local area communication signal receiver coupled to the control circuit to extract identification data from local area communication signals transmitted from a local area communication signal transmitter, which is in close proximity (e.g., within 10 to 200 meters) to the mobile station, in accordance with a standard for wireless local area data communication (e.g., IEEE 802.11 or WiFi, IEEE 802.15 or Bluetooth); and, a cellular communication signal transceiver coupled to the control circuit to communicate with a remote server; where the mobile station has no capability of transmitting local area communication signals to the local area communication signal transmitter. In one example of an embodiment, the broadcast range of the local area communication signal transmitter is less than 20 meters. In one example of an embodiment, the mobile station uses the cellular communication signal transceiver to communicate with the remote server to determine a location of the mobile station from at least one of: the SPS positioning information and the identification data. In one example of an embodiment, the remote station combines the SPS positioning information and the identification data to determine a position of the mobile station.

In one aspect of the present invention, a beacon station in a position determination system, includes: memory to store identification data; and, a local area communication signal transmitter coupled with the memory to transmit local area communication signals modulated with the identification data in accordance with a standard for wireless local area data communication (e.g., IEEE 802.11 or WiFi, IEEE 802.15 or Bluetooth); wherein the beacon station has no capability to receive local area communication signals. In one example of an embodiment, the beacon station further includes: a communication port coupled with the memory, through which the identification data stored in the memory can be configured using an external programmer. In one example of an embodiment, the memory of the beacon station further stores transmission strength data; and, the local area communication signal transmitter transmits the local area communication signals at a signal strength level according to the transmission strength data. For example, the transmissions strength data in the memory is programmable to adjust a coverage area of the local area communication signals.

In one aspect of the present invention, a method to operate a position determination system includes: placing one or more beacon stations within a site, which are configured to broadcast radio signals containing data identifying the site that has a known location; and, adjusting transmission strength of the one or more beacon stations to adjust a coverage area of the radio signals transmitted from the one or more beacon stations (e.g., transmitted according to IEEE 802.11 or WiFi, IEEE 802.15 or Bluetooth). In one example of an embodiment, the one or more beacon stations are programmed to broadcast the data identifying the site. In one example of an embodiment, a database is maintained to associate the data identifying the site with commercial information of the site. In one example of an embodiment, the data identifying the site includes an altitude of the site or a coordinate position. In one example of an embodiment, the coverage area is adjusted so that the radio signals containing data identifying the site do not misidentify neighboring sites.

In one aspect of the present invention, a method implemented on a mobile station to determine a position of the mobile station, including: determining SPS (Satellite-Positioning System) positioning information from SPS signals received at the mobile station; and, determining identification data from local area communication signals transmitted from a local area communication signal transmitter, the local area communication signals being in accordance with a standard for wireless local area data communication (e.g., IEEE 802.11 or WiFi, IEEE 802.15 or Bluetooth); where both the SPS positioning information and the identification data are used to determine the position of the mobile station. For example, the identification data includes at least one of: an identification of the local area communication signal transmitter; an identification of a site within which the local area communication signal transmitter is located; an altitude of a location in a site within which the local area communication signal transmitter is located; a coordinate position of a location in a site within which the local area communication signal transmitter is located; and, a street address of a site within which the local area communication signal transmitter is located. In one example of an embodiment, the SPS positioning information and the identification data are transmitted from the mobile station to a position determination entity through a cellular communication link to determine the position of the mobile station. In one example of an embodiment, cellular positioning information is further determined from cellular communication signals of the cellular communication link, which is transmitted to the position determination entity to determine the position of the mobile station. In one example of an embodiment, the local area communication signal transmitter is located within a site; and, the mobile station automatically receives web page information related to the site through the cellular communication link. In one example of an embodiment, the identification data includes at least one position coordinate (e.g., indicating an altitude of a location in close proximity to the mobile station); and, the SPS positioning information and the identification data are combined to determine the position of the mobile station. In one example of an embodiment, at least one position coordinate associated with the identification data is received through a cellular communication link; and the SPS positioning information and at least one position coordinate are combined to determine the position of the mobile station. In one example of an embodiment, the broadcast range of the local area communication signal transmitter is less than 100 meters.

In one aspect of the present invention, a method implemented on a server to serve a remote mobile station in a position determination system, includes: receiving identification data from the remote mobile station through a cellular communication link, the identification data being extracted at the remote mobile station from local area communication signals transmitted from a local area communication signal transmitter in accordance with a standard for wireless local area data communication (e.g., IEEE 802.11 or WiFi, IEEE 802.15 or Bluetooth); and determining a position of the remote mobile station using the identification data. In one example of an embodiment, a coordinate position is looked up from a database according to the identification data. In one example of an embodiment, cellular positioning information is further received from the remote mobile station through the cellular communication link; where the cellular positioning information is generated at the remote mobile station from cellular communication signals received at the remote mobile station, and the position of the remote mobile station is determined using at least the cellular positioning information and the coordinate position. In one example of an embodiment, SPS (Satellite Positioning System) positioning information is further received from the remote mobile station through the cellular communication link; where the SPS positioning information is generated at the remote mobile station from SPS signals received at the remote mobile station, and the position of the remote mobile station is determined using at least the SPS positioning information and the coordinate position. In one example of an embodiment, a site within which the remote mobile station is located is determined using at least one of: the identification data and the position of the remote mobile station; and data related to the site is automatically transmitted to the remote mobile station through the cellular communication link in response to a determination that the mobile station enters the site. In another example of an embodiment, a site is determined using at least one of: the identification data and the position of the remote mobile station; and data related to the site is automatically transmitted to the remote mobile station through the cellular communication link in response to a determination that the mobile station exits the site.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
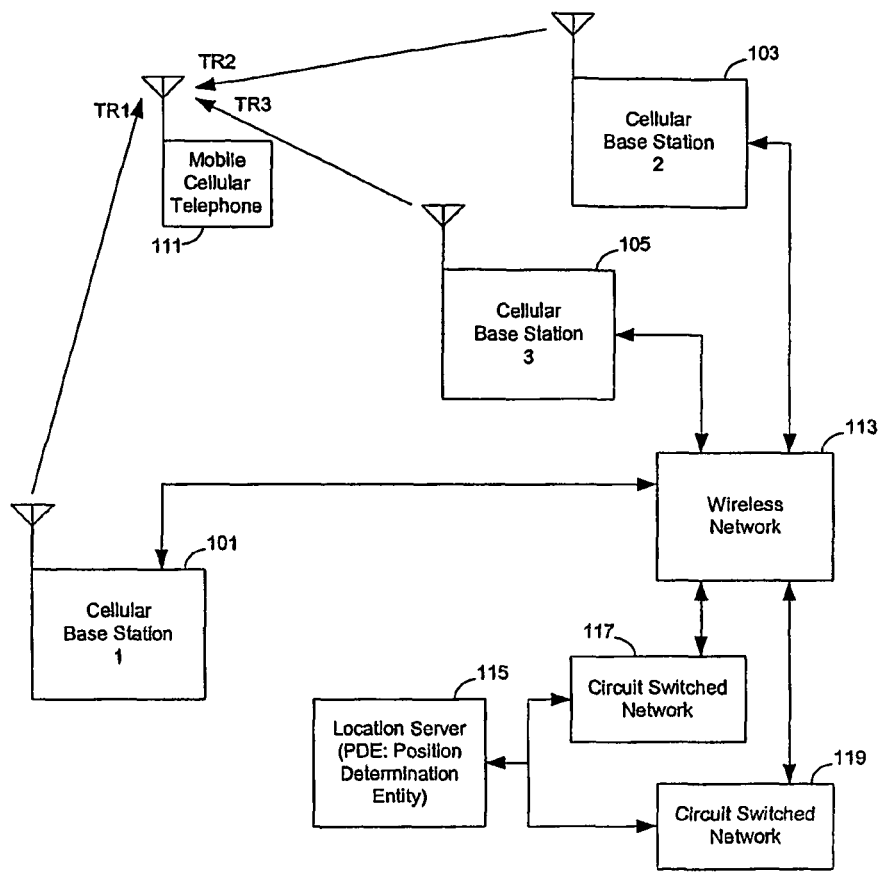
FIG. 1 shows an example of a prior art cellular network which determines the position of a mobile cellular device.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention References to one or an embodiment in the present disclosure are not necessarily references to the same embodiment; and, such references mean at least one.

Recent developments in the technologies for wireless local area data communication, such as Bluetooth and WiFi (Wireless Fidelity), lead to low cost, mass market electronics for short range wireless data communication. Such low cost electronic components can be used for short range wireless data communication in accordance with wireless communication standards, such as those developed by the Institute of Electrical and Electronics Engineers, Inc. (IEEE) (e.g., IEEE 802.15 for Wireless Personal Area Networks (WPAN) and IEEE 802.11 for Wireless Local Area Networking (WLAN)).

For example, the Bluetooth technology provides robust, low complexity, low power and low cost radio links for mobile devices, which is the basis of IEEE 802.15 standard. Bluetooth radio operates in the unlicensed ISM (Industrial, Scientific and Medical) band at 2.4 GHz. Low-power use of such a band is allowed without a license. Bluetooth provides a short range (e.g., 10 centimeters to 10 meter, extendible to 100 meters), frequency-hopping radio link between devices, designed to replace cable connections with radio links for mobile devices or fixed devices. The Bluetooth radio converts the digital baseband data to and from a 2.4 GHz analog signal using Gaussian Frequency Shift Keying (GFSK) modulation. Interference is avoided by hopping to a new frequency after transmitting or receiving a packet. By changing frequencies, many Bluetooth devices can use the same frequency band for wireless data communication. A Bluetooth transmitter transmits a unique "Global ID", which is used to create a hopping pattern. A FHS (Frequency Hopping Synchronization) packet is used to transmit the clock offset, from which the phase within the hopping pattern can be determined so that both devices linked by a Bluetooth connection can hop together for data communication.

Bluetooth communication may transmit about 1 Megabit per second, not including headers and handshaking, to a distance of 10 meters. Since Bluetooth is designed to have as low cost as cables, single chip CMOS Bluetooth radio may be obtained for under $10.

WiFi is based on the IEEE 802.11b standard and can be used at distances up to 305 meters (in open areas) between the transmitter and the receiver. WiFi can transmit data at a speed up to 11 Mbs. Like Bluetooth, WiFi also uses spread spectrum frequency hopping and operates in the 2.4 GHz range. WiFi was designed to form computer networks without the need to run cables to individual computers. WiFi is compatible with existing Ethernet technology. Access points can be directly connected to existing wired networks. For example, a user can use a wireless router (e.g., for about $70 to $100) to set up a wireless network access point and one wireless network card for each computer (e.g., about $50 for a wireless network card) to connect the computers wirelessly to each other through the wireless access point.

A GPS based position determination system or a hybrid position determination system can provide highly reliable and precise location information for mobile stations in most geographic environments. However, for example, in the deepest indoor environments, the location fix yield is much reduced due to the blockage of GPS signals. Even when wireless cellular communication systems are utilized to supplement the GPS system (e.g., using AFLT or EOTD) in a hybrid position system, resulting location fixes may still not be precise enough to enable many valuable location based services.

In one embodiment of the present invention, the microcell beacon broadcasts identification information (e.g., the unique ID of the transmitter, a street address, an identity of a commercial site), which can be used to look up for a position coordinate of the transmitter. The identification information broadcast at the microcell beacon and received at the mobile station may be further transmitted from the mobile station to a remote server (e.g., a position determination identity) using the cellular communication link of the mobile station to determine the position of the mobile station. The cellular communication link may be in accordance with Telecommunications Industry Association (TIA)/Electronic Industries Alliance (EIA) Standards, such as IS-95, IS-856 or IS-2000. For example, the cellular communication system may be based on TDMA (Time Division Multiple Access), GSM (Global System for Mobile communications), CDMA (Code Division Multiple Access), W-CDMA (Wideband Code Division Multiple Access), UMTS (United Mobile Telecommunication System), TD-SCDMA (Time Division Synchronous Code Division Multiple Access), IDEN (Integrated Digital Enhanced Network), HDR (High Data Rate), or other similar cellular networks. Alternatively, the microcell beacon transmits its location coordinates so that the mobile station can choose an optimal location for a particular environment by combining the location information it receives from various transmitters (e.g., microcell beacons, GPS satellites, cellular communication base stations). For example, altitude information broadcast by the microcell beacon can be used for altitude aiding in determining the position of the mobile station.

In at least one embodiment of the present invention, one or more microcell beacons are used with a wide area location system, such as a hybrid GPS system, to provide precise location fixes in highly blocked environments where there are commercial and/or safety based applications. For example, microcell beacons can be used in areas where it is desirable to have a fast and precise location identification for emergency responses (e.g., an area of a high crime rate or accident rate). For example, microcell beacons may be installed within lightening fixtures or with security devices (e.g., security camera) in an area where the precision and the location fix yield are reduced due to the blockage of GPS signals. Thus, the location of a mobile station from which an emergency call (e.g., 911) is placed can be quickly identified in the these areas where the blockage of GPS signals may otherwise prevent a fast and precise location identification based on only the wide area location system.

In one embodiment of the present invention, microcell beacons use short range data transmitters that are based on mass market electronics for local area data communication, such as Bluetooth or WiFi. These beacons are installed in areas where precise locations of the mobile station are valuable based on commercial or safety reasons. The mobile stations are equipped with the capabilities to receive the microcell beacon signals (e.g., using Bluetooth chips or WiFi based electronics).

In one embodiment, the mobile station supports only the receiving capability of Bluetooth or WiFi to further reduce the cost impact on the mobile station. Alternatively, the mobile station may have very limited transmission capability for wireless local area data communication so that effectively the mobile station can only receive data from the microcell beacon but not transmit data to the microcell beacon through the Bluetooth (or WiFi) radio. The limited transmission capability may be used for data communication with devices other than the microcell beacons. Similarly, the microcell beacon may support only the transmission capability of WiFi or Bluetooth, but not the receiving capability, to reduce the cost.

Figure 6:
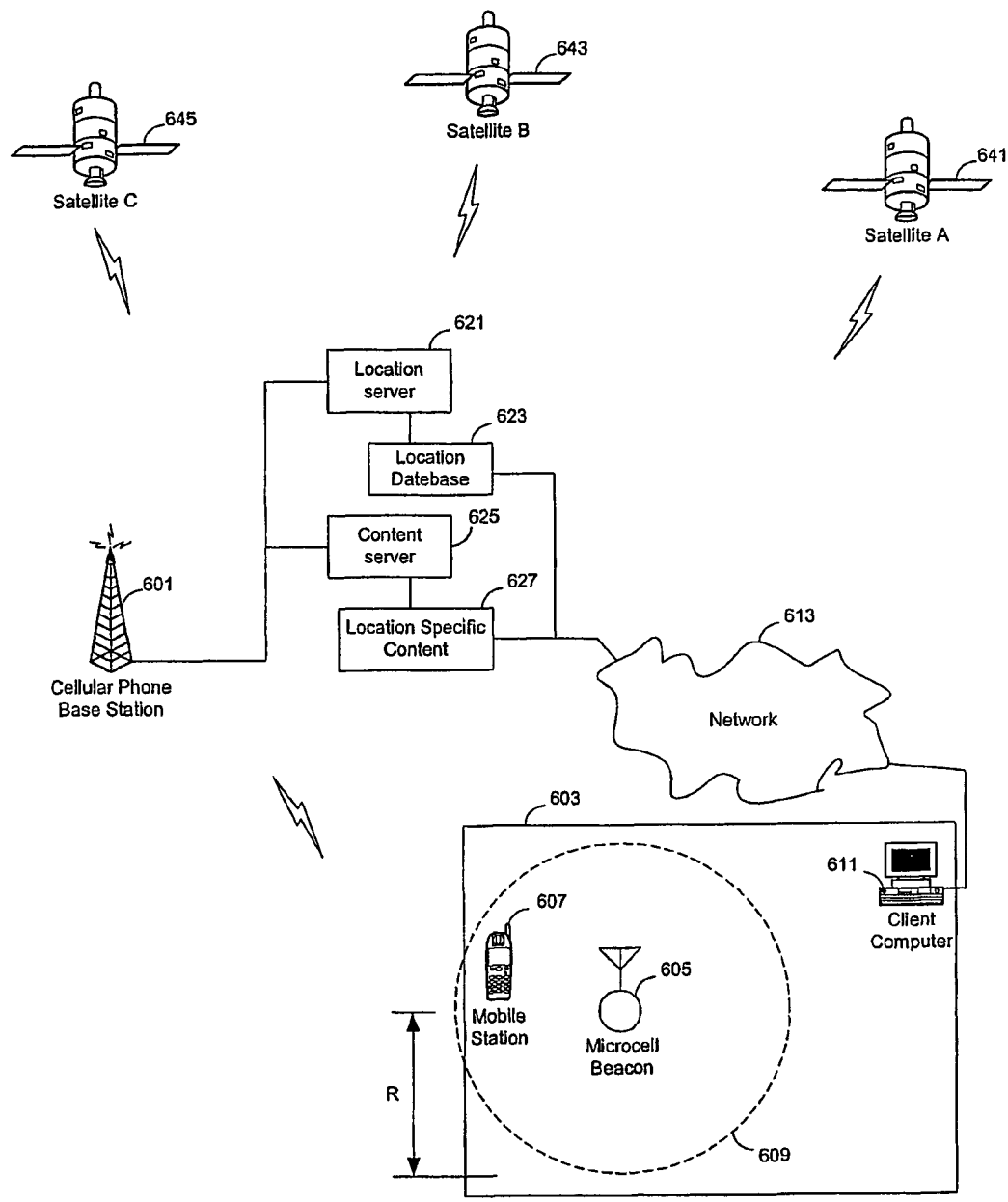
FIG. 6 illustrates a position determination system for the location of a handset according to one embodiment of the present invention.

FIG. 6 illustrates a position determination system for the location of a handset according to one embodiment of the present invention. In FIG. 6, mobile station 607 has the capability of receiving GPS signals from GPS satellites (e.g., 641-645). When mobile station 607 is in a position where GPS signals can be received to determine GPS positioning information (e.g., pseudoranges to in view satellites or time of arrival of GPS signals at the mobile station), the GPS positioning information is used to determine the position of the mobile station.

Further, mobile station 607 has the capability of communicating with location server 621 using a cellular communication link between mobile station 607 and cellular phone base station 601. Thus, the mobile station may transmit the GPS positioning information (e.g., the pseudoranges to in view GPS satellites, or copies of GPS signal samples) to location server 621. The location server then computes the position of the mobile station using at least the information that is transmitted from the mobile station to the location server through the cellular communication link. The location server may further use other information, such as ephemeris data extracted from GPS signals received at a GPS receiver collocated with the basestation, in computing the position of the mobile station.

In an environment where the reception of GPS signals is poor (e.g., in the urban canyon environment, such as within construction 603), using the received GPS signals along may not yield a location solution of sufficient precision. The cellular communication signals can be further used to derive cellular positioning information (e.g., time of reception of cellular communication signals or round trip delay), which can be with the GPS positioning information in a hybrid position determination system. The additional cellular positioning information may improve the accuracy and/or the yield of the position solution of the mobile station.

According to one embodiment of the present invention, one or more microcell beacon stations (e.g., beacon 605) are selectively used to further provide positioning information for an accurate position determination of the mobile station. The beacon station use low cost, mass market electronics for wireless data communication (e.g. Bluetooth or WiFi radios) to broadcast information. The microcell beacon station has a short range (e.g., from a few meters to less than 100 meters) such that the knowledge of the coverage area of a microcell beacon station can reduce the uncertainty of the position of the mobile station. Further, microcell beacon 605 may broadcast an altitude of a location where the microcell beacon is located so that the altitude information can be used for altitude aiding. For example, the microcell beacon station can broadcast the altitude of a floor of a building where the microcell beacon station is installed. The microcell beacon may further broadcast its location coordinates, which can be weighted heavily against GPS positioning information derived from weak GPS signals.

For example, in determining the location of the mobile station, the position of the microcell beacon, if known, can be weighted heavily against weak GPS positioning information in a least square procedure to determine the position of the mobile station. Further, cellular positioning information (e.g., the range to the cellular phone base station determined from a round trip time measurement or a measurement of the time of arrival of the cellular communication signals at the mobile station) can be used with the location of the microcell beacon in determining the position solution of the mobile station in sufficient precision for location based services.

In one embodiment of the present invention, the positioning information derived from the GPS signals, cellular communication signals and the microcell beacon signals is transmitted to location server 621 for the calculation of the position of the mobile station. Alternatively, the mobile station may perform the position calculation using the positioning information derived from the GPS signals, cellular communication signals and the microcell beacon signals. The location server may provide additional information to the mobile station through the cellular communication link between the mobile station and the cellular phone base station. For example, the location server may look up location coordinates from a database based on the identification information the mobile station received from the microcell beacon.

In one embodiment, the mobile station is assumed to be at the position that is indicated by the microcell beacon station when the GPS signals are not available (or having a signal strength below a threshold value). For example, when it is determine that the accuracy of a position solution is degraded to a threshold level (e.g., due to the blockage of GPS signals), the center of the coverage area of the microcell beacon station is used as the position solution for the mobile station. When beacon signals from more than one microcell beacon station are received, the centers of the coverage areas of the microcell beacon stations can be weighted according to the corresponding signal strength to determine an estimate of the position of the mobile station. Further, the microcell beacon may also broadcast the transmission strength level so that a range to the microcell beacon can be estimated from the transmission strength level and the received signal strength level at the mobile station.

In one embodiment of the present invention, a microcell beacon station is placed in a site where accurate position solutions of the mobile station are highly desirable. For example, the operator of a commercial site (e.g., a book store, a coffee shop, or a department store) may want to gain access to users of mobile stations. If a mobile station can determine whether or not it is within the site, location based service information can be provided to the mobile station depending whether or not the mobile station is within the site through the cellular communication link of the mobile station. For example, when the mobile station enters the site, the base station may transmit information (e.g., coupon, special of the day, or a web page) about the site to the mobile station (e.g., according to the preferences of the user of the mobile station). When the commercial site is partially or entirely in an area where the blockage of GPS signals is severe, microcell beacon station can be placed within the site to argument the position determination system. From the position of the mobile station and/or the identification information provided by the beacon station, location server 621 can determine reliably whether or not the mobile station is within the site. Depending on the position of the mobile station, content sever 625 selectively provides location specific content to the mobile station automatically based on the identity of the site, which may be of interest to the user of the mobile station. Content server 625 is connected with a database of location specific content 627, which may be updated by the operator of the commercial site through network 613 (e.g., Internet) using client computer 611. Thus, it may not be necessary for the operator of the commercial site to maintain a separate wireless content delivery system within the site (e.g., in building 603). However, it is understood that a separate content delivery system can also use the microcell beacon stations as wireless access points to deliver location based information. For example, when the mobile station is within the site, the base station transmits information to the mobile station to indicate that the content information specific to the site is available through wireless local area data communication. The user may then have to the option of further use the wireless local area data communication link (e.g., Bluetooth or WiFi) to obtain further information.

Microcell beacon stations can be placed to provide location information or identification information in a wide area position system (e.g., GPS, AFLT, or hybrid system) to increase the speed to obtain a position solution. For example, the position coordinates provided by a microcell beacon can be used as an initial solution in obtaining a GPS based position solution. In areas where blockage of GPS signals is severe, microcell beacons can be used to improve the solution by providing additional measurements for the position determination process. Further, microcell beacons can provide information such as street address, identity of the site in which the microcell beacons are installed, zone identification information, etc., which can be directly used for the emergency response purpose (e.g., for fire, medical, or police responses). Such information received at the mobile station can be quickly relayed to a service station through the cellular phone link (e.g., when an emergency phone number, such as 911, is dialed).

Figure 5:
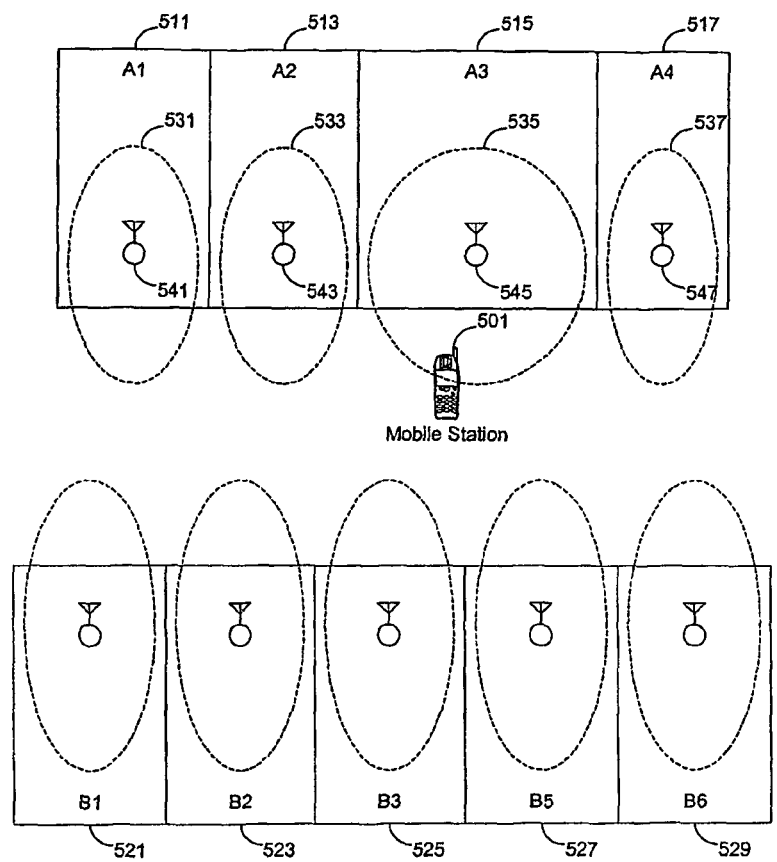
FIG. 5 shows one example scenario of using microcell beacons according to one embodiment of the present invention.

FIG. 5 shows one example scenario of using microcell beacons according to one embodiment of the present invention. In FIG. 5, mobile station 501 is in an environment where the blockage of GPS signals is severe. For example, there are a number of stores and shops (e.g., 511-517, 521-529) in a commercial complex. When a conventional hybrid position determination system is used, the position solution of the mobile station may not be precise enough to accurately determine which store the mobile station is in. According to one embodiment of the present invention, microcell beacons are placed to aid the position determination. For example, the position information (e.g., altitude aiding information) broadcast at the microcell beacons are used to improve the accuracy of the position solution so that it can be reliably determined which of the stores (e.g., 511-517, 521-529) the mobile station is in. In one embodiment of the present invention, the signal transmission strength of the microcell beacons and the distribution of the microcell beacons are adjusted during the installation process such that the beacon signals identifying one of the stores covers substantially the store. Thus, when the mobile station enters the store, the dominant beacon signals received at the mobile station identifies the store. For example, the beacon signals for store 511-517 have coverage areas 531-537 respectively so that when mobile stations 501 receives a signal beacon signal for a store (e.g., store 515 when the mobile station is in area 535), the mobile station can identify the store from the beacon signal (e.g., the store ID broadcast by beacon 545). When the mobile station can precisely determine its position from GPS signals, whether or not the mobile station is in a store can be determined from a map of the building. Thus, the microcell beacons are used to improve the location capability of the system in area where the GPS signal blockage severely degrades the accuracy of position solutions. The coverage areas of the microcell beacons for different stores may overlap with each other. In one embodiment of the present invention, the microcell beacons are used to broadcast information specific to the store in which they are installed. Thus, during the installation of the microcell beacons, the placement and the signal transmission strength of the microcell beacons are adjusted so that the coverage of the dominant beacon signals substantially covers the store without substantially intruding into neighboring stores to cause misidentification.

FIG. 5 illustrates a situation where each store (e.g., 511-517) has only one microcell beacon station (e.g., 541-547). It is understood that in general more than one microcell beacon station can be used to create a desirable coverage, depending on the size of the store, GPS signal blockage conditions, radio signal blockage conditions, desirability of coverage, and others. For example, it may be desirable to have the radio coverage extended into the hallway (e.g., area between stores 511-517 and stores 521-529) in front of a store so that when mobile station 501 is in front of the store (e.g., store 515) the mobile station can be identified as being within the site of the store. Thus, information related to the store (e.g., electronic coupons, special of the day, a web page of the store, or other information that the user of mobile station 501 may be interested) can be transmitted to the mobile station (e.g., through the cellular communication link of the mobile station). However, the coverage of microcell beacons may not be extended into an area in the store where it is typically inaccessible to a customer, since there may be no commercial interest in improving the position determination precision in such an area.

Figure 4:
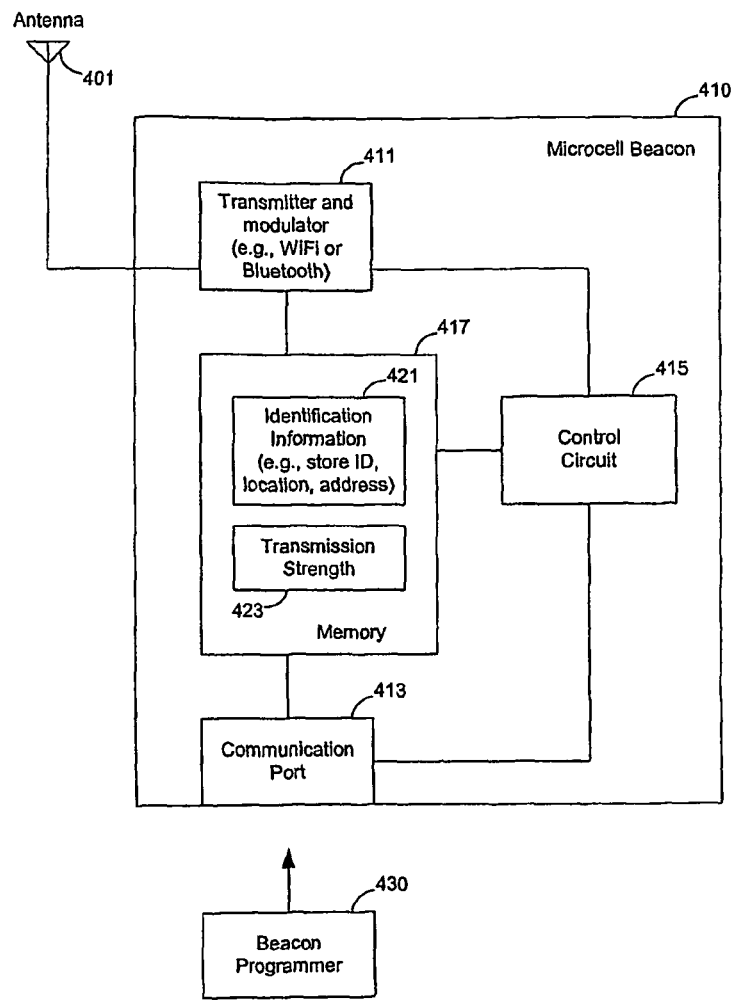
FIG. 4 shows a microcell beacon according to one embodiment of the present invention.

FIG. 4 shows a microcell beacon according to one embodiment of the present invention. Microcell beacon 410 may use an antenna 401 for increased broadcast range. Microcell beacon 410 includes transmitter and modulator 411 for transmission according to wireless local area data communication standards (e.g., WiFi or Bluetooth). For example, a single chip Bluetooth radio can be used. In one embodiment of the present invention, mass market electronics for wireless local area data communication standards are used for the transmitter and modulator to reduce the cost of the system. In one embodiment of the present invention, a low cost microcell beacon (e.g., 410) has a transmitter but no receiver capability for local area wireless data communication. Alternatively, a microcell beacon station can have both the transmission capability and the receiving capability for local area wireless data communication so that the microcell beacon station can be programmed wirelessly. For example, a beacon station may be fully equipped with Bluetooth or WiFi capability so that a Bluetooth or WiFi enabled beacon programmer can be used to configure the identification information and specify the signal transmission strength. Further, the microcell beacon station may receive data from a mobile station through a wireless local area data communication link (e.g., WiFi or Bluetooth) to relay the data to a remote service station (e.g., through Internet).

Microcell beacon 410 further contains memory 417 to store identification information 421 (e.g., a store ID, a location coordinate, a street address). For example, the microcell beacon can store and broadcast the altitude for altitude aiding. Alternatively, the microcell beacon may simply store a unique identification number, which can be used in a database (e.g., 623 in FIG. 6) to lookup location information about the site (e.g., the street address, a phone number of a land line phone, location coordinates, altitude, site identity, and others).

Control circuit 415 controls transmitter and modulator 411 to broadcast identification information 421 periodically. Further, memory 423 may store transmission strength 423 which is programmable to adjust the coverage range of the transmitter. Microcell beacon 410 further includes communication port 413, which can be used to connect to a beacon programmer (e.g., 430) to program the data in memory 417. Alternatively, a microcell beacon may not use a communication port for a wired connection to program the transmission strength and identification information. When equipped with the receiving capability for wireless local area date communication, a beacon station can be programmed wirelessly. Alternatively, other communication methods (e.g., an Infrared port) can be used.

Figure 7:
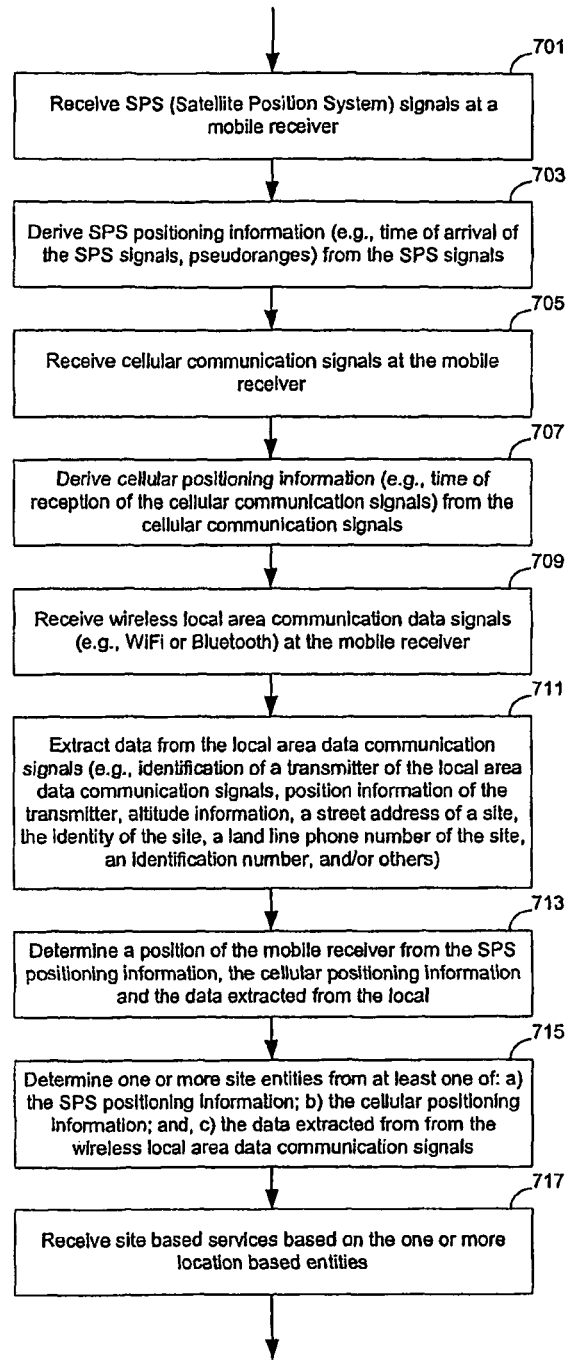
FIG. 7 shows one method to provide location based services according to one embodiment of the present invention.

FIG. 7 shows one method to provide location based services according to one embodiment of the present invention. In operation 701, a mobile receiver receives SPS (Satellite Position System) signals (e.g., GPS signals). Operation 703 derives SPS positioning information (e.g., time of arrival of the SPS signals, pseudoranges) from the SPS signals. In operation 705, the mobile receiver receives cellular communication signals. Operation 707 derives cellular positioning information (e.g., time of reception of the cellular communication signals) from the cellular communication signals. In operation 709, the mobile receiver receives wireless local area data communication signals (e.g., WiFi or Bluetooth). Operation 711 extracts data from the wireless local area data communication signals (e.g., an identification of a transmitter of the local area communication signals, position information of the transmitter, altitude information, a street address of a site, the identity of the site, a land line phone number of the site, an identification number, and/or others). Operation 713 determines a position of the mobile receiver from the SPS positioning information, the cellular positioning information and the data extracted from the local. For example, the altitude information can be used for altitude aiding. The position coordinates of the transmitter can be weighted against other measurements in determine the position solution for the mobile station. Further, the identity (or the identification number) of the transmitter or the site can be used to look up position information (e.g., the position coordinates of the transmitter or altitude information) from a database. The position calculation may be performed at the mobile station or at a remote location server. Operation 715 determines one or more site entities from at least one of: a) the SPS positioning information; b) the cellular positioning information; and, c) the data extracted from the wireless local area data communication signals. Note that a mobile station at one location may be associated with more than one site entity, each of which may be of interest to a user of the mobile station, such as one or more sites that the mobile station is currently in, one or more sites that the mobile station is moving into, and one or more sites that the mobile station is moving out of. Different site entities may overlap with each other. Operation 717 receives site based services based on the one or more location based entities.

Figure 8:
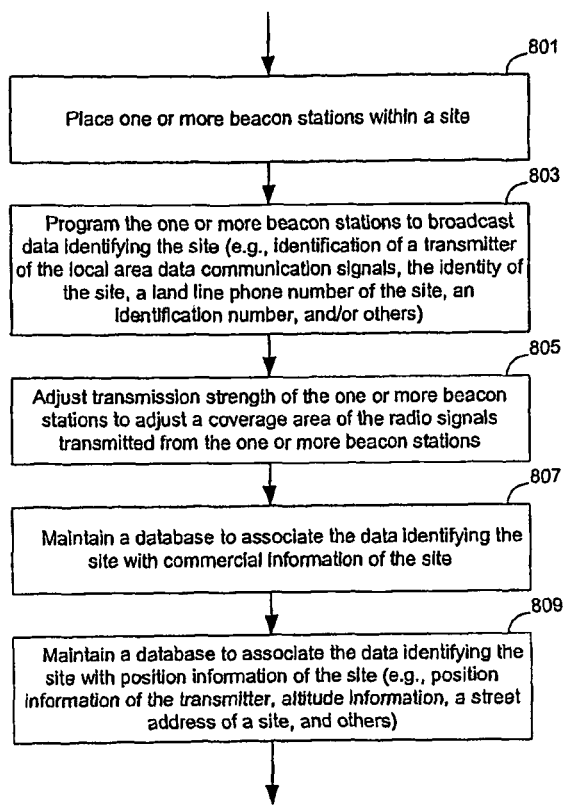
FIG. 8 shows one method to enhance a position determination system according to one embodiment of the present invention.

FIG. 8 shows one method to enhance a position determination system according to one embodiment of the present invention. One or more beacon stations are placed within a site in operation 801. In operation 803, the one or more beacon stations are programmed to broadcast data identifying the site (e.g., identification of a transmitter of the local area data communication signals, the identity of the site, a land line phone number of the site, an identification number, and/or others). The data identifying the site can be received by a mobile station to improve the precision of the position solution of the mobile station. In operation 805, the transmission strength of the one or more beacon stations are programmed to adjust a coverage area of the radio signals transmitted from the one or more beacon stations. The coverage area of the radio signals may be adjusted to within the boundary of the site so that a neighbor of the site will not be misidentified. Operation 807 maintains a database to associate the data identifying the site with commercial information of the site. Thus, when a mobile station is identified to be entering (or exiting) the site, the commercial information (e.g., electronic coupon, a web page of advertisement) is automatically transmitted to the mobile station for display. Operation 809 maintains a database to associate the data identifying the site with position information of the site (e.g., position information of the transmitter, altitude information, a street address of a site, and others).

Figure 3:
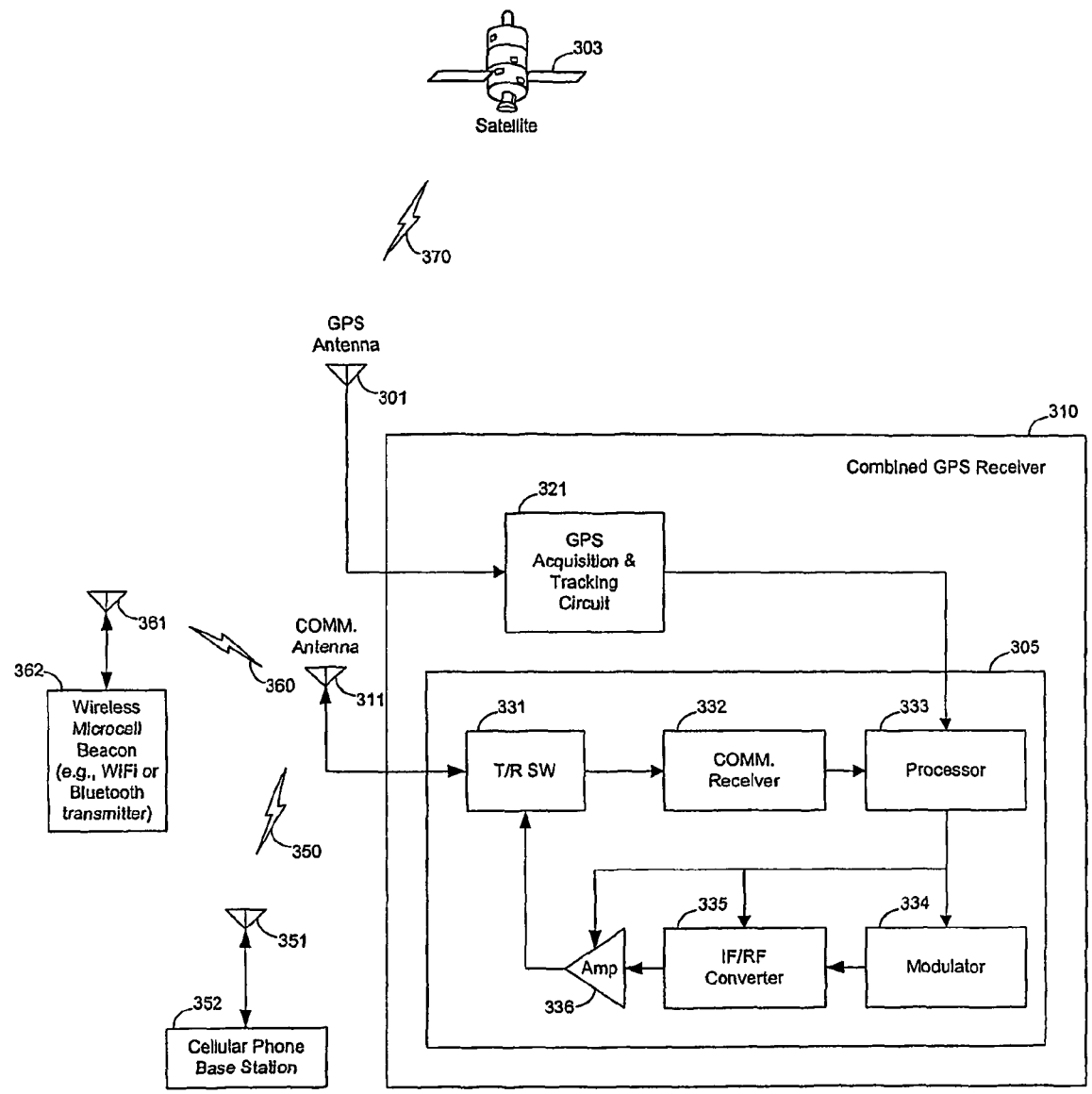
FIG. 3 shows a block diagram representation of a mobile station according to one embodiment of the present invention.

FIG. 3 shows a block diagram representation of a mobile station according to one embodiment of the present invention. The mobile station includes a portable receiver, which combines a communication transceiver with GPS receiver for use in one embodiment of the present invention. The combined mobile unit 310 includes circuitry for performing the functions required for processing GPS signals as well as the functions required for processing communication signals received through a communication link. Communication link 350 is a cellular communication to base station 352 having communication antenna 351. Radio signal 360 is from wireless microcell beacon station 362 with antenna 361. Note that a wireless microcell beacon station with a short range may not use an external antenna. Although FIG. 3 illustrates an embodiment that communication antenna 311 is used for receiving signals from different types of wireless communication signals (e.g., from microcell beacon station 362 for wireless local area data communication and from based station 352 for cellular phone service), the combined receiver may use separate and distinct antennas for receiving signals of different air interfaces. Further, the combined receiver may use separate and distinct components for at least a partial processing of the received wireless signals and may or may not share some components in the processing of the wireless signals of different air interfaces. For example, the combined receiver may have separate circuits for the Bluetooth or WiFi signal processing and share same data processor resources. For example, a Bluetooth radio chip can be used to process Bluetooth signals. Alternatively, the processing of Bluetooth signals and cellular communication signals may share common circuitry. From this description, various combinations and variations of the combined receiver will be apparent to one skilled in the art.

Portable receiver 310 is a combined GPS receiver and a communication receiver and transmitter. Receiver 310 contains a GPS receiver stage including acquisition and tracking circuit 321 and communication transceiver section 305. Acquisition and tracking circuit 321 is coupled to GPS antenna 301, and communication transceiver 305 is coupled to communication antenna 311. GPS signals (e.g., signal 370 transmitted from satellite 303) are received through GPS antenna 301 and input to acquisition and tracking circuit 321 which acquires the PN (Pseudorandom Noise) codes for the various received satellites. The data produced by circuit 321 (e.g., correlation indicators) are processed by processor 333 for transmittal by transceiver 305. Communication transceiver 305 contains a transmit/receive switch 331 which routes communication signals (typically RF) to and from communication antenna 311 and transceiver 305. In some systems, a band splitting filter, or "duplexer," is used instead of the T/R switch. Received communication signals are input to communication receiver 332 and passed to processor 333 for processing. Communication signals to be transmitted from processor 333 are propagated to modulator 334 and frequency converter 335. Power amplifier 336 increases the gain of the signal to an appropriate level for transmission to base station 352.

In one embodiment of the present invention, a low cost combined receiver does not have the circuitry and capability to transmitting signals for wireless local area data communication. The low cost combined receiver only receives the data broadcast from the wireless microcell beacon station. Alternatively, the receiver may have both the transmission circuit and the receiving circuit for wireless local area data communication. For example, the receiver may be fully Bluetooth enabled. In one embodiment of the present invention, the combined receiver has a much shorter Bluetooth radio range for transmitting (e.g., less than 1 meter) than the microcell beacon station (e.g., with a range of about 10 meters). The Bluetooth capability of the combined the receiver is primary for wireless connection to other devices. However, since the microcell beacon station has a longer Bluetooth radio range for transmission than the mobile receiver, the mobile receiver can effectively used as the Bluetooth receiver to extract the data broadcast from the microcell beacon station to aid position determination.

In one embodiment of the present invention, communication transceiver section 305 is capable to use the cellular communication signal to extract timing indicators (e.g., timing frames or system time) or to calibrate the local oscillator (not shown in FIG. 3) of the mobile station. More details about the mobile station for extracting timing indicators or calibrating the local oscillator can be found in U.S. Pat. Nos. 5,874,914 and 5,945,944.

In one embodiment of the combined GPS/communication system of receiver 310, data generated by acquisition and tracking circuit 321 is transmitted to a server over communication link 350 to base station 352. The server then determines the location of receiver 310 based on the data from the remote receiver, the time at which the data were measured, and ephemeris data received from its own GPS receiver or other sources of such data. The location data can then be transmitted back to receiver 310 or to other remote locations (e.g., an emergency response station). More details about portable receivers utilizing a communication link can be found in U.S. Pat. No. 5,874,914.

In one embodiment of the present invention, the combined GPS receiver includes (or is coupled to) a data processing system (e.g., a personal data assistant, or a portable computer). The data processing system includes a bus which is coupled to a microprocessor and a memory (e.g., ROM, volatile RAM, non-volatile memory). The bus interconnects various components together and also interconnects these components to a display controller and display device and to peripheral devices such as input/output (I/O) devices, which are well known in the art. The bus may include one or more buses connected to each other through various bridges, controllers and/or adapters as are well known in the art. In one embodiment, the data processing system includes communication ports (e.g., a USB (Universal Serial Bus) port, a port for IEEE-1394 bus connection). In one embodiment, processor 305 combines the information derived from GPS signals 370, cellular communication signals 350, and wireless local area data communication signals 360 to determine the position of the mobile station.

Figure 2:
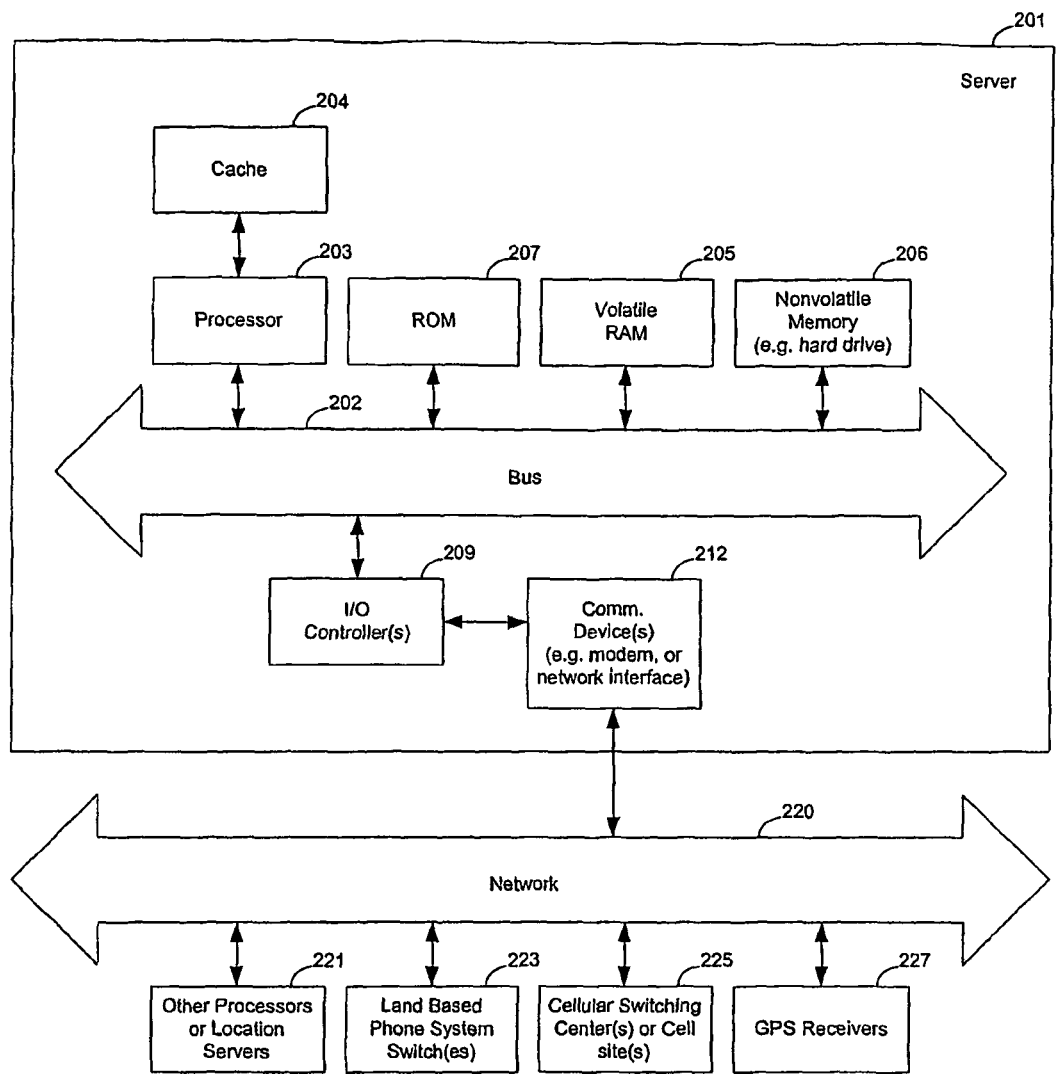
FIG. 2 shows an example of a server which may be used with the present invention.

FIG. 2 shows an example of a data processing system which may be used as a server in various embodiments of the present invention. For example, as described in U.S. Pat. No. 5,841,396, the server (201) may provide assistance data such as Doppler or other satellite assistance data to the GPS receiver in a mobile station. In addition, or alternatively, the server may perform the final position calculation rather than the mobile station (after receiving pseudoranges or other data from which pseudoranges can be determined from the mobile station) and then may forward this position determination result to the base station or to some other system. The data processing system as a server (e.g., a location server, an almanac server) typically includes communication devices 212, such as modems or network interface. The location server may be coupled to a number of different networks through communication devices 212 (e.g., modems or other network interfaces). Such networks include the cellular switching center or multiple cellular switching centers 225, the land based phone system switches 223, cellular base stations (not shown in FIG. 2), other GPS receivers 227, or other processors or location servers 221.

Multiple cellular base stations are typically arranged to cover a geographical area with radio coverage, and these different base stations are coupled to at least one mobile switching center, as is well known in the art (e.g., see FIG. 1). Thus, multiple base stations would be geographically distributed but coupled together by a mobile switching center. The network 220 may be connected to a network of reference GPS receivers which provide differential GPS information and may also provide GPS ephemeris data for use in calculating the position of mobile systems. The network is coupled through the modem or other communication interface to the processor 203. The network 220 may be connected to other computers or network components. Also network 220 may be connected to computer systems operated by emergency operators, such as the Public Safety Answering Points which respond to 911 telephone calls. Various examples of methods for using a location server have been described in numerous U.S. patents, including: U.S. Pat. Nos. 5,841,396, 5,874,914, 5,812,087 and 6,215,442.

The server 201, which is a form of a data processing system, includes a bus 202 which is coupled to a microprocessor 203 and a ROM 207 and volatile RAM 205 and a non-volatile memory 206. The processor 203 is coupled to cache memory 204 as shown in the example of FIG. 2. The bus 202 interconnects these various components together. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers and/or adapters as is well known in the art. In many situations the location server may perform its operations automatically without human assistance. In some designs where human interaction is required, the I/O controller 209 may communicate with displays, keyboards, and other I/O devices.

Note that while FIG. 2 illustrates various components of a data processing system, it is not intended to represent any particular architecture or manner of interconnecting the components as such details are not germane to the present invention. It will also be appreciated that network computers and other data processing systems which have fewer components or perhaps more components may also be used with the present invention and may act as a location server or a PDE.

In some embodiments, the methods of the present invention may be performed on computer systems which are simultaneously used for other functions, such as cellular switching, messaging services, etc. In these cases, some or all of the hardware of FIG. 2 would be shared for several functions.

It will be apparent from this description that aspects of the present invention may be embodied, at least in part, in software. That is, the techniques may be carried out in a computer system or other data processing system in response to its processor executing sequences of instructions contained in memory, such as ROM 207, volatile RAM 205, non-volatile memory 206, cache 204 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the processor 203.

A machine readable medium can be used to store software and data which when executed by a data processing system causes the system to perform various methods of the present invention. This executable software and data may be stored in various places including for example ROM 207, volatile RAM 205, non-volatile memory 206 and/or cache 204 as shown in FIG. 2. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

Although the methods and apparatus of the present invention have been described with reference to GPS satellites, it will be appreciated that the descriptions are equally applicable to positioning systems which utilize pseudolites or a combination of satellites and pseudolites. Pseudolites are ground-based transmitters which broadcast a PN code (similar to a GPS signal), typically modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolites or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar Satellite Positioning Systems (SPS), and in particular, the Russian GLONASS system and the proposed European Galileo System. The GLONASS system primarily differs from GPS system in that the emissions from different satellites are differentiated from one another by utilizing slightly different carrier frequencies, rather than utilizing different pseudorandom codes. In this situation substantially all the circuitry and algorithms described previously are applicable. The term "GPS" or "SPS" used herein includes such alternative satellite positioning systems, including the Russian GLONASS system, and the European Galileo System.

The above examples are illustrated without presenting some of the details known in the art; as pointed out in the above discussion, these details can be found in publications, such as U.S. Pat. Nos. 5,812,087, 5,841,396, 5,874,914, 5,945,944, 5,999,124, 6,061,018, 6,208,290, and 6,215,442, all of which are hereby incorporated here by reference.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
  receiving, by a mobile device, first signals from one or more wide area position determination system transmitters;
  obtaining, by the mobile device, one or more first measurements based, at least in part, on the first signals;
  receiving, by the mobile device, second signals broadcasted from one or more microcell beacon stations, the second signals including a transmission strength level of the respective second signals and information indicative of a location of the respective microcell beacon stations;
  determining, by the mobile device, a received signal strength level of each of the second signals;
  obtaining, by the mobile device, one or more second measurements based, at least in part, on the second signals, wherein obtaining at least one of the second measurements includes computing at least a first range to at least a first one of the microcell beacon stations based, at least in part, on the transmission strength level and the determined received signal strength level for the second signals broadcast from the first one of the microcell beacon stations; and
  combining the first and second measurements and the information indicative of the location of the first one of the microcell beacon stations to compute an estimated location of the mobile device.

2. The method of claim 1, wherein the first one of the microcell beacon stations includes a Bluetooth transmitter.

3. The method of claim 1, wherein the first one of the microcell beacon stations includes a WiFi transmitter.

4. The method of claim 1, wherein the one or more wide area position system transmitters are part of a satellite positioning system.

5. The method of claim 1, wherein the information indicative of the location comprises a street address associated with a location of the first one of the microcell beacon stations.

6. The method of claim 1, wherein the information indicative of the location comprises latitude and longitude position coordinates associated with a location of the first one of the microcell beacon stations.

7. The method of claim 6, wherein the information indicative of the location further comprises altitude position coordinates associated with the location of the first one of the microcell beacon stations.

8. A mobile device comprising:
  a first receiver to acquire first signals transmitted from one or more wide area position determination system transmitters;
  a second receiver to acquire second signals transmitted from one or more local microcell beacons, the second signals including a transmission strength level of the respective second signals and information indicative of a location of the respective microcell beacon stations; and
  a processor to:
    obtain one or more first measurements based, at least in part, on the first acquired signals;
    determine a received signal strength level of each of the acquired second signals;
    obtain one or more second measurements based, at least in part, on the second signals, wherein obtaining at least one of the second measurements includes computing at least a first range to at least a first one of the microcell beacon stations based, at least in part, on the transmission strength level and the determined received signal strength level for the second respective second signals; and
    combine the first and second measurements and the information indicative of the location of the first one of the microcell beacon stations to compute an estimated location of the mobile device.

9. An article comprising:
  a non-transitory machine readable medium containing computer program instructions which, when retrieved from the medium and executed by one or more processors of a mobile device, instruct the one or more processors to:
    receive first signals from one or more wide area position determination system transmitters;
    obtain one or more first measurements based, at least in part, on the first signals;
    receive second signals broadcasted from one or more microcell beacon stations, the second signals including transmission strength level of the respective second signals and information indicative of a location of the respective microcell beacon stations;
    determine a received signal strength level of each of the second signals;
    obtain one or more second measurements based, at least in part, on the second signals, wherein obtaining at least one of the second measurements includes computing at least a first range to at least a first one of the microcell beacon stations based, at least in part, on the transmission strength level and the determined received signal strength level for the second signals broadcast from the first one of the microcell beacon stations; and combine the first and second measurements and the information indicative of the location of the first one of the microcell beacon stations to compute an estimated location of the mobile device.

10. An apparatus comprising:
means for receiving, by a mobile device, first signals from one or more wide area position determination system transmitters and for receiving, by the mobile device, second signals broadcasted from one or more microcell beacon stations, the second signals including a transmission strength level of the respective second signals and information indicative of a location of the respective microcell beacon stations;
means for determining, by the mobile device, a received signal strength level of each of the second signals;
means for obtaining, by the mobile device, one or more first measurements based, at least in part, on the first signals;
means for obtaining, by the mobile device, one or more second measurements based, at least in part, on the second signals, wherein obtaining at least one of the second measurements includes computing at least a first range to at least a first one of the microcell beacon stations based, at least in part, on the transmission strength level and the determined received signal strength level for the second signals broadcast from the first one of the microcell beacon stations; and
means for combining the first and second measurements and the information indicative of the location of the first one of the microcell beacon stations to compute an estimated location of the mobile device.

11. A method comprising:
receiving, by a mobile device, first signals transmitted from one or more wide area position determination system transmitters;
computing a position solution for a position of the mobile device based on the first signals;
determining that an accuracy of the position solution has degraded below a threshold level;
receiving, by the mobile device, second signals broadcasted from one or more microcell beacon stations, the second signals including a transmission strength level of the respective second signals and information indicative of a location of the respective microcell beacon stations;
determining, by the mobile device, a received signal strength level of each of the second signals;
computing at least a first range to at least a first one of the microcell beacon stations based, at least in part, on the transmission strength level and the determined received signal strength level for signals received from the at least first one of the microcell beacon stations;
modifying the computed position solution or computing a new position solution based on the first range and the information indicative of the location of the first one of the microcell beacon stations in response to determining that an accuracy of the position solution computed based on the received first signals has degraded below the threshold level.

12. The method of claim 11, wherein the one or more wide area position determination system transmitters are part of a satellite positioning system (SPS).

13. The method of claim 12, wherein the SPS includes at least one global positioning system (GPS) transmitter.

14. The method of claim 11, wherein the one or more wide area position determination system transmitters include one or more cellular transmitters.

15. The method of claim 11, wherein the second signals are transmitted from locally fixed beacon stations.

16. The method of claim 11, wherein the information indicative of the location of the first one of the microcell beacon stations includes latitude and longitude coordinates of the first one of the microcell beacon stations.

17. The method of claim 11, wherein the information indicative of the location of the first one of the microcell beacon stations includes a street address of the first one of the microcell beacon stations.

18. A mobile device comprising:
a first receiver to acquire first signals transmitted from one or more wide area position determination system transmitters;
a second receiver to acquire second signals broadcast from one or more microcell beacon stations, the second signals including a transmission strength level of the respective second signals and information indicative of a location of the respective microcell beacon stations;
a processor to:
compute a position solution for a position of the mobile device based on the first signals;
determine that an accuracy of the position solution has degraded below a threshold level;
determine a received signal strength level of each of the second signals;
compute at least a first range to at least a first one of the microcell beacon stations based, at least in part, on the transmission strength level and the determined received signal strength level for signals acquired from the at least first one of the microcell beacon stations; and
modify the computed position solution or compute a new position solution based on the first range and the information indicative of the location of the first one of the microcell beacon stations in response to determining that an accuracy of the position solution computed based on the acquired first signals has degraded below the threshold level.

19. An article comprising:
a non-transitory machine readable medium containing computer program instructions which, when retrieved from the medium and executed by one or more processors of a mobile device, instruct the one or more processors to:
receive first signals from one or more wide area position determination system transmitters;
compute a position solution based on the first signals;
determine that an accuracy of the position solution has degraded below a threshold level:
receive second signals broadcasted from one or more microcell beacon stations, the second signals including transmission strength level of the respective second signals and information indicative of a location of the respective microcell beacon stations;
determine a received signal strength level of each of the second signals;
compute at least a first range to at least a first one of the microcell beacon stations based, at least in part, on the transmission strength level and the determined received signal strength level for signals acquired from the at least first one of the microcell beacon stations;

modify the computed position solution or compute a new position solution based on the first range and the information indicative of the location of the first one of the microcell beacon stations in response to determining that an accuracy of the position solution computed based on the first signals has degraded below the threshold level.

20. An apparatus comprising:

means for receiving first signals transmitted from one or more wide area position determination system transmitters;

means for computing a position solution for a position of the mobile device based on the first signals;

means for receiving second signals broadcast from one or more microcell beacon stations, the second signals including a transmission strength level of the respective second signals and information indicative of a location of the respective microcell beacon stations;

means for determining that an accuracy of the position solution has degraded below a threshold level;

means for determining that a received signal strength level of each of the second signals;

means for computing at least a first range to at least a first one of the microcell beacon stations based, at least in part, on the transmission strength level and the determined received signal strength level for signals acquired from the at least first one of the microcell beacon stations; and means for modifying the computed position solution or computing a new position solution based on the first range and the information indicative of the location of the first one of the microcell beacon stations in response to determining that an accuracy of the position solution computed based on the first signals has degraded below the threshold level.

\* \* \* \* \*